United States Patent Office 3,442,785
Patented May 6, 1969

3,442,785
MACHINE ELECTROLYTIC GRINDING TOOL CONTROL APPARATUS
Arlyn T. Easton, Florence, Ky., assignor to The Cincinnati Milling Machine Co., Cincinnati, Ohio, a corporation of Ohio
Filed Dec. 23, 1965, Ser. No. 516,043
Int. Cl. B23p 1/12
U.S. Cl. 204—224       4 Claims

ABSTRACT OF THE DISCLOSURE

The disclosure and description herein is of a servo-controlled feed system for use in an electrolytic grinding machine. The system operates to vary the rate of relative movement between the electrolytic grinding wheel of the machine and a workpiece in accordance with changes in the mechanical load on the grinding wheel which physically contacts the work during a grinding operation.

---

It is the object of this invention to provide an electrolytic grinding machine in which the volume of material removed in a grinding operation tends to remain constant per unit of time despite a varying depth or width of cut in a single pass of the grinding wheel.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention is employed in an electrolytic grinding machine operating to remove metal from a workpiece in accordance with the principles described in U.S. Patent 2,826,540 issued to George F. Keeleric on Mar. 11, 1958. The system is particularly applicable in an operation in which a varying depth of cut occurs in a single pass of the grinding wheel across the workpiece. The invention resides in the combination of the grinding wheel or spindle motor which is provided with a motor load detection circuit and a direct current feed motor that is controlled by a silicon controlled rectifier. These are arranged such that the silicon controlled rectifier alters the armature current of the feed motor in response to the spindle motor load signal such that during light cuts a fast feed is achieved and during heavy cuts a slower feed is maintained to thus tend to hold constant the volume of material removed per unit of time.

A clear understanding of the invention can be obtained from the following detailed description of a preferred embodiment of the invention in which reference is made to the attached drawings wherein.

Figure 1:
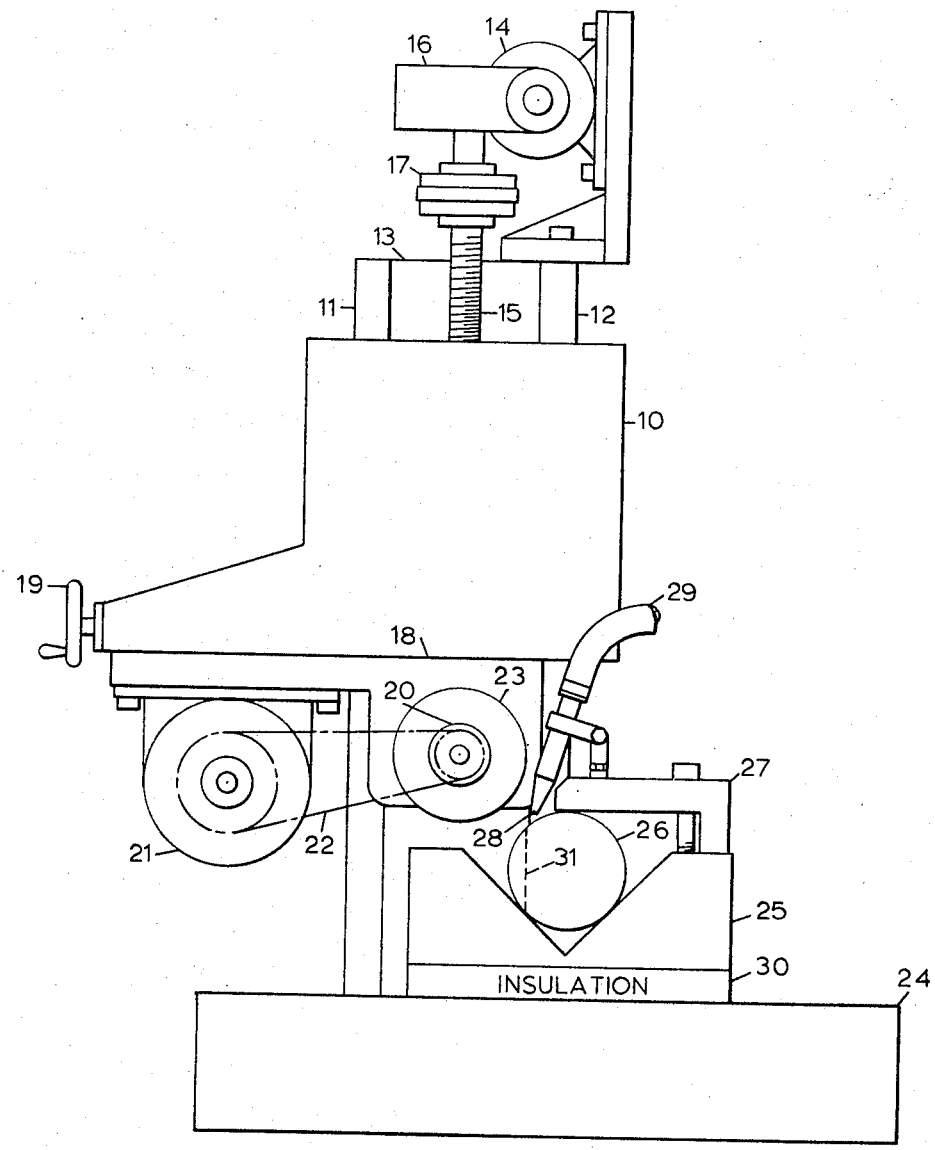
FIG. 1 is a simplified front elevational showing of an electrolytic grinding machine.

The electrolytic grinding machine of FIG. 1, employs a carrier 10 that is vertically movable along ways 11, 12 on a column 13 by means of a direct current motor 14 driving a feed screw 15 in rotation through a gear box 16 and coupling 17. A spindle housing 18 is received on the lower side of the carrier 10 for movement in a direction transverse to the column 13 by means of a handwheel 19 and screw connection (not shown). The housing 18 has mounted therein a spindle 20 that is rotated by a spindle motor 21 also mounted on the housing 18 and connected to the spindle 20 by a drive belt 22. The spindle 20 is adapted for mounting a conductive grinding wheel 23 to which the cathode side of a direct current power source (not shown) is connected and which employs a non-conductive grit imbedded in its periphery. The spindle 20 and wheel 23 are electrically insulated from the main machine structure.

The machine also has a work table 24 on which a vee-block fixture 25 is supported and the fixture 25 is adapted to hold a cylindrical workpiece 26 having one end projecting outward to a position beneath the wheel 23. The workpiece 26 is held in the fixture by a clamp 27 and fluid electrolyte is supplied to the projecting end of the workpiece 26 through a nozzle 28 supported on the clamp 27. Electrolyte is supplied to the nozzle 28 from a supply pump and reservoir (not shown) through a hose 29. The fixture 25 is electrically isolated from the rest of the machine by means of an insulation layer 30 and the anode of the direct current power source is connected to the fixture 25 so that the workpiece 26 is anodic with respect to the wheel 23.

The workpiece 26 is to be provided with a flat surface 31 by means of an electrolytic grinding operation on its end projecting from the fixture 25. The surface 31 is produced by passing the periphery of the wheel 23 in a chordal path through the workpiece as the carrier 10 is lowered on the ways 11, 12 by operation of the motor 14. As can be seen the initial depth of cut is very slight at first contact between the wheel 23 and work 26 but constantly increases to a maximum depth. The depth of cut thereafter decreases until the wheel 23 no longer contacts the work 26. The major volume of metal removed from the work 26 is dependent upon the current flow between the wheel 23 and work 26 and assuming a constant amperage power supply connected across these, the initial rate of movement of the wheel 23 can be much greater than that rate when the maximum depth of cut is reached.

Figure 2:
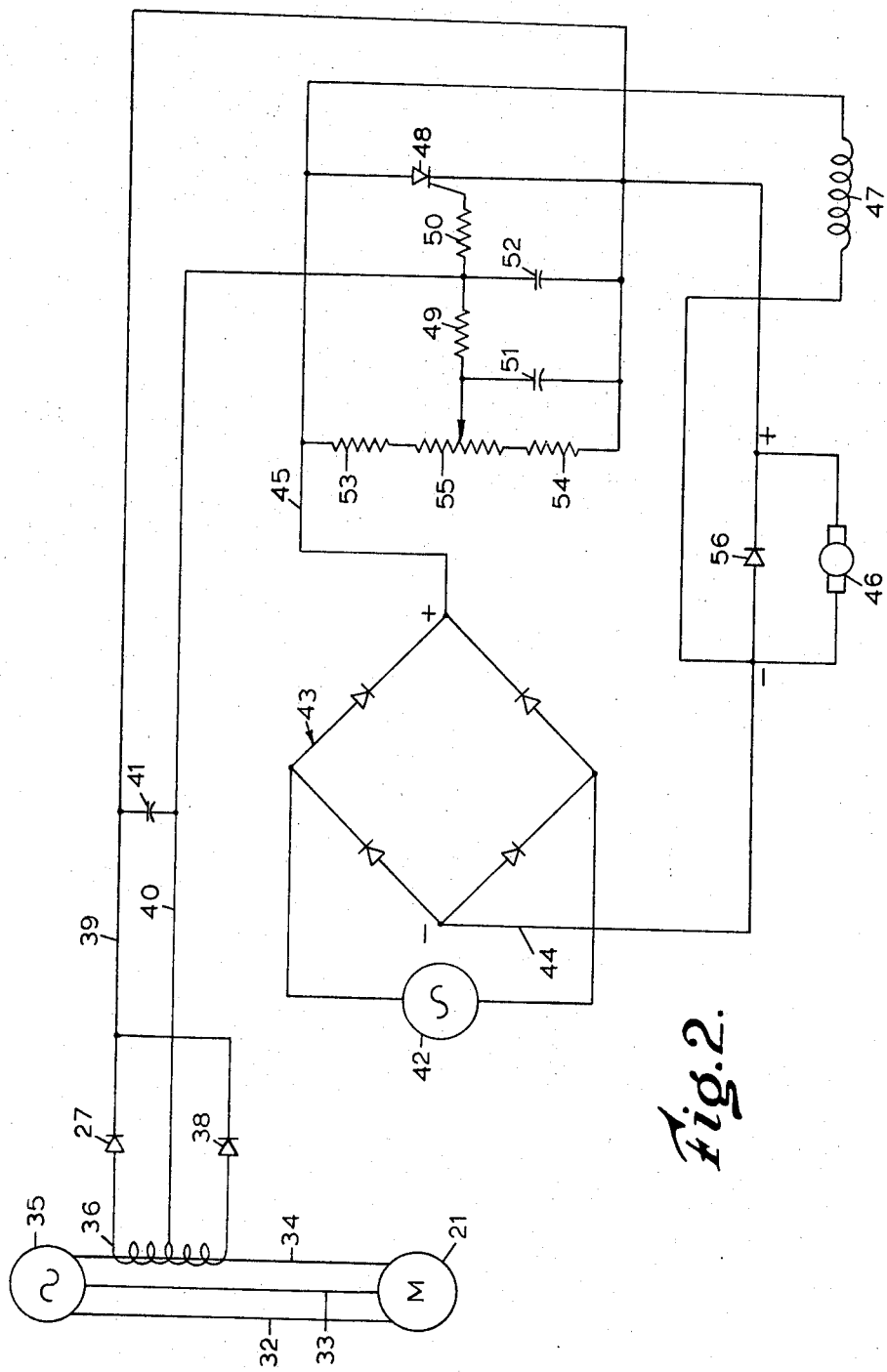
FIG. 2 is a wiring diagram for the electrical control circuit in the grinding wheel feed system of the machine of FIG. 1.

In FIG. 2, there is shown a feed rate control circuit by menas of which the rate of operation of the feed motor 14 is constantly adjusted to be compatible with the instantaneous depth of cut of the wheel 23 into the work 26 so as to tend to keep the volume of metal removed from the work constant per unit of time. Since a small amount of metal removal from the workpiece 26 is due to abrasive action of the wheel 23, as the depth of cut increases, the mechanical work done by the wheel 23 increases and there is a greater power requirement in the constant speed spindle motor 21. The three phase power lines 32, 33, 34 from the supply 35 carry more current as the power requirements increase. A signal is developed in a transformer 36 that is inductively coupled with the power line 34 and as the current through the line 34 increases, the voltage of the signal developed in the transformer 36 increases. Since the supply to the motor 21 is an alternating current, the signal induced in the transformer 36 is also an alternating signal. This induced signal is rectified by means of a pair of diodes 37, 38 which provide full wave rectification so that a direct current signal is applied on a pair of output lines 39, 40. A filter capacitor 41 is connected across the lines 39, 40 to eliminate the ripple and electrical noise in the direct current signal. This rectified and filtered signal across the lines 39, 40 represents the control or feedback information from the cutting process and it varies directly as the rate of metal removal.

A source 42 of alternating current power is connected across a full wave rectifier 43 to produce a pulsating direct current power supply across the lines 44, 45. The line 44 is connected directly to one side of the armature 46 of the motor 14 and to one side of the field winding 47 of that motor. The other line 45 is connected directly to the other side of the field winding 47 and to the anode terminal of a silicon controlled rectifier 48. The silicon controlled rectifier 48 is connected at its cathode terminal to the armature 46 and the average conduction level through the rectifier 48 determines the speed of operation of the motor 14. The armature 46 is provided with a path through a diode 56 that opens to short the inductively produced power in the armature when the energizing power from the direct current source 43 is removed.

The average current through the controlled rectifier 48 is regulated by the charge and discharge rate or frequency of a resistance-capacitance circuit that includes the resistors 49, 50 and capacitors 51, 52. An adjustable voltage divider including resistances 53, 54 and potentiometer 55 is also included in the system to provide a source of changing voltage for the capacitors 51, 52 in the resistance-capacitance circuit. This voltage divider is connected at one end to the reference line 45 and at the other end to the feedback signal line 39 at a junction point between the cathode of the controlled rectifier 48 and the armature 46 so that it is in parallel with the controlled rectifier 48. The potentiometer 55 is adjustable to set the time constant for the resistance-capacitance circuit at a selected value so that a preset maximum frequency of control pulses to the controlled rectifier 48 are produced by the alternate charging and discharging of the capacitors 51, 52 when there is a minimum feedback signal across the lines 39, 40. The discharge of the capacitors 51, 52 produces a control signal on the control gate of the rectifier 48 which turns it on to conduct until the control signal disappears and the direct current voltage from the source 43 drops to a predetermined low level. This produces a preset maximum average current through the controlled rectifier and the armature 46 so that the motor 14 runs at a corresponding maximum speed under no cutting load conditions.

The feedback signal line 40 is connected directly to the junction between the resistances 49, 50 in the resistance-capacitance network so that, as the signal level across the feedback signal lines 39, 40 increases in potential, the time constant of this network is altered to reduce the frequency of charge and discharge of the capacitors 51, 52. Therefore the average conduction through the rectifier 48 to the armature 46 is reduced and the motor 14 is slowed in its operation. Since the mechanical work done by the wheel 23 is directly proportional to the area of contact between the wheel 23 and the workpiece 26 and the current requirements to the motor 21 are directly dependent on this mechanical work, the signal across the lines 39, 40 is directly proportional to the area of contact. The area of contact between the wheel 23 and workpiece 26 is dependent on the width and depth of cut at any instant. By adjusting the speed of the feed motor 14 inversely as the amplitude of the signal across the lines 39, 40 changes, the volume of metal removed tends to remain constant. Therefore for very small depths of cut, the feed rate approaches the maximum rate set by the potentiometer 55 while in deep cuts the feed rate is slowed. The same operation holds true for cuts varying from narrow widths to wider widths. Compensation for the differences in hardness of materials to be cut is made by the operator in adjusting the potentiometer 55 which adjusts the basic no-load feed rate from which further reduction is made as the depth or width of cut is increased.

What is claimed is:

1. In an electrolytic grinding machine having a conductive grinding wheel advanced toward a conductive workpiece by a direct current feed motor, a system tending to maintain a constant volume of stock removal per unit of time regardless of variations in cut depth and width comprising in combination:
    (a) means for producing a control signal directly proportional to the mechanical work being done by the grinding wheel,
    (b) a direct current power source,
    (c) an electrical valve operable when turned on to connect said power source to the feed motor,
    (d) means for intermittently turning said valve on at a frequency to produce an average power level conduction therethrough to operate the feed motor at a preselected speed, and
    (e) means for reducing the frequency of operation of said electrical valve in inverse proportion to the magnitude of said control signal to inversely adjust the speed of the feed motor as changes occur in the area of contact between the grinding wheel and workpiece.

2. The electrolytic grinding apparatus of claim 1 wherein:
    (a) said power source produces a pulsating direct current voltage,
    (b) said electrical valve is a controlled rectifier having a gate terminal to turn on said rectifier to conduct when a control signal is applied thereto, and
    (c) said means for turning the electrical valve on is a resistance and capacitance network connected across said power source and to said gate terminal and producing a series of control signals on said gate terminal.

3. The electrolytic grinding apparatus of claim 2 wherein:
    (a) said resistance and capacitance network includes a potentiometer presettable to adjust the frequency of charge and discharge of said resistance and capacitance network to preset the maximum conduction of power through the controlled rectifier.

4. The electrolytic grinding apparatus of claim 2 wherein:
    (a) said control signal is a direct current signal having an amplitude directly proportional to the mechanical work being done by the grinding wheel, and
    (b) said means for reducing the frequency of operation of said electrical valve is a circuit connecting said control signal across said resistance and capacitance network to reduce the frequency of operation thereof in direct proportion to the amplitude of said control signal.

References Cited

UNITED STATES PATENTS

| 3,401,102 | 9/1968 | Stiff | 204—228 XR |
| 3,155,879 | 11/1964 | Casey et al. | 317—32 |
| 3,219,564 | 11/1965 | Wilkinson | 204—224 XR |
| 3,280,016 | 10/1966 | Bass et al. | 204—228 XR |
| 3,288,693 | 11/1966 | Livshits. | |

JOHN H. MOCK, *Primary Examiner.*

D. R. VALENTINE, *Assistant Examiner.*

U.S. Cl. X.R.

204—143, 225, 228